United States Patent [19]

Gladieux et al.

[11] 4,013,438
[45] Mar. 22, 1977

[54] APPARATUS FOR MANUFACTURE OF FLOAT GLASS

[75] Inventors: Norman K. Gladieux, Oregon; James W. Miller, Rossford, both of Ohio

[73] Assignee: Libbey-Owens-Ford Company, Toledo, Ohio

[22] Filed: Oct. 6, 1975

[21] Appl. No.: 619,570

[52] U.S. Cl. .................................. 65/94; 65/99 A; 65/182 R

[51] Int. Cl.² .......................................... C03B 18/02

[58] Field of Search ................. 65/99 A, 182 R, 93, 65/94

[56] References Cited

UNITED STATES PATENTS

| | | | |
|---|---|---|---|
| 3,433,612 | 3/1969 | Dickinson et al. | 65/99 A |
| 3,468,651 | 9/1969 | Boaz | 65/182 R X |
| 3,664,820 | 5/1972 | Montgomery | 65/99 A |
| 3,798,017 | 3/1974 | Classen | 65/99 A |
| 3,871,854 | 3/1975 | Milnes | 65/99 A X |

Primary Examiner—Robert L. Lindsay, Jr.
Attorney, Agent, or Firm—Collins, Oberlin & Darr

[57] ABSTRACT

A float glass facility which is readily adaptable to the production of float glass ribbons of different thicknesses and particularly to so-called thick or heavy float glass, that is, thicknesses greater than 0.250 inch (6mm). Longitudinally extending fenders are installed to limit the ultimate lateral flow of the glass, and the splay of extension tiles pivotally connected to the restrictor tiles is adjusted to suitably limit the initial spread of the molten glass on the molten bath before it is delivered between the fenders. The adjacent ends of the extension and restrictor tiles meet in an enclosed joint which permits angular adjustment between the members without interference by the molten glass and bath of molten metal.

13 Claims, 7 Drawing Figures

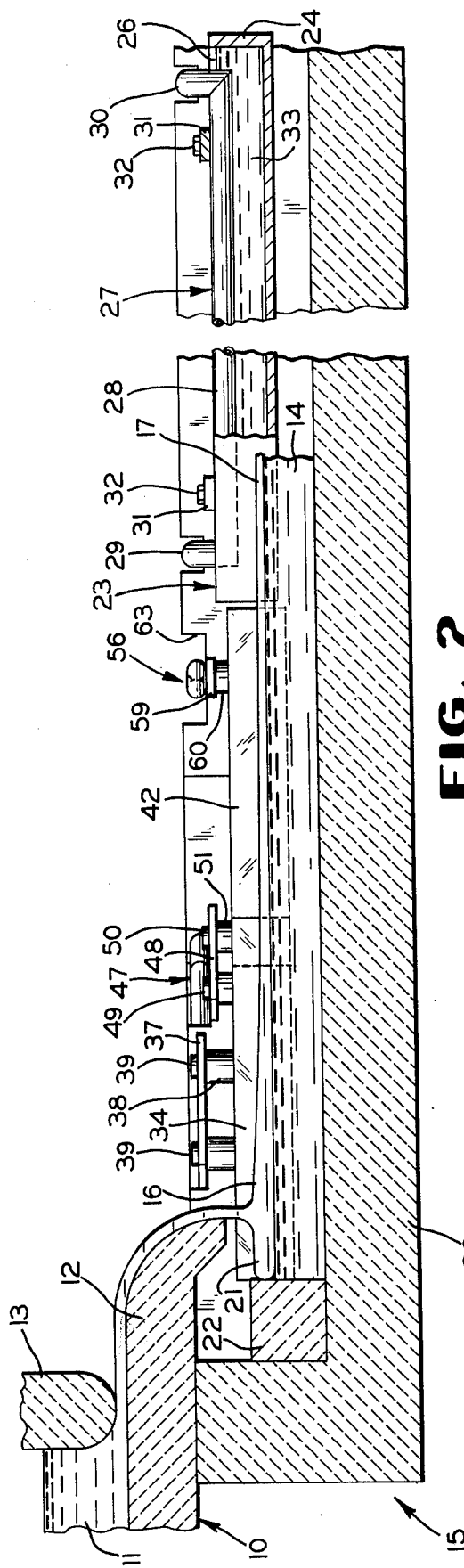
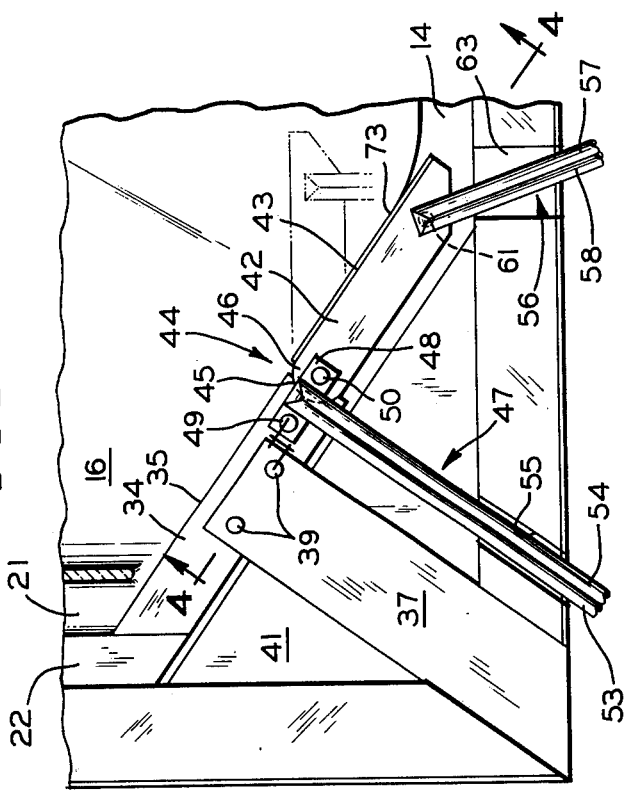
FIG. 2
FIG. 3

APPARATUS FOR MANUFACTURE OF FLOAT GLASS

BACKGROUND OF THE INVENTION

1. Field of the Invention

The present invention relates broadly to the manufacture of float glass and, more particularly, to improved apparatus for changing from production of a ribbon of regular thickness or less, that is, 0.250 inch (6 mm) or below, to so-called heavy float glass up to about one inch (25 mm) or more in thickness and vice versa. The novel arrangement of restrictor tiles, extension tiles and fenders permits the apparatus to be converted from production of one category of glass to the other with a minimum expenditure of time and effort.

DESCRIPTION OF THE PRIOR ART

A conventional form of float glass apparatus is illustrated and described in the U.S. Pat. No. 3,083,551. As therein explained, the manufacture of flat glass by the float process involves delivering molten glass at a controlled rate along a canal from a melting furnace onto a bath of molten metal such as tin or an alloy thereof, and advancing it along the surface of the bath under physical and thermal conditions which assure (1) that a floating body of molten glass which is free to flow laterally is established on the molten metal, (2) that from this molten glass body there will develop on the surface of the metal bath a buoyant layer of molten glass and, (3) that from this layer there is developed on the bath under the influence of the forces of surface tension and gravity, a buoyant body of glass in ribbon form as the glass is advanced along the bath toward the outlet end. Such apparatus is suitable for producing a glass ribbon of so-called equilibrium thickness wherein the glass is allowed to flow unhindered to the limits of its free flow capability, which is conventional soda-lime-silica glass is on the order of 0.250 inch (6 mm). By suitably manipulating the temperatures and the speed of advancement to longitudinally stretch the glass, a glass ribbon of less than equilibrium thickness can also be produced. In order to provide a full range of thicknesses to match those of flat glass made by other glass making processes, it is desirable and necessary to produce a ribbon of greater than equilibrium thickness.

The conventional manner of making so-called heavy float glass is illustrated in U.S. Pat. No. 3,663,196. As shown therein, longitudinally extending fenders are installed within the bath structure to limit the lateral spreading of the glass as it advances across the molten bath until such time as it has been cooled sufficiently to prevent further spreading when it is no longer confined by the fenders.

In float glass apparatus so-called restrictor tiles are conventionally employed to initially guide and restrict the flow of molten glass as it is deposited on the metal bath from the flow spout. These restricting tiles have diverging vertical walls which allow the molten glass to spread under controlled conditions during its initial period of advance. For producing different thicknesses of glass ribbon, different angles of divergence or splay may be desirable between the walls of the restricting tiles. Thus, in producing a ribbon of conventional equilibrium thickness, the restricting walls of the tiles would have a certain optimum splay or angle of divergence and spread at their extremities which would be ideal for that particular installation and type of glass ribbon. For producing heavy glass, on the other hand, the optimum angle of divergence would be much less in order to restrict the initial spread and direct the molten glass between the fenders.

In early float glass apparatus, these restrictor tiles were of a particular shape and were fixed in place so that in order to change their spread or splay, the tiles had to be removed and replaced with other units cut to the desired configuration. Thus, each time the facility was switched to or from the production of heavy glass, it was necessary to remove and replace the restrictor tiles. So-called extension tiles having a particular angle of divergence were also added at the downstream end of the restrictor tiles to achieve the desired splay. These extension tiles were also mounted in a fixed location and had to be replaced when changing to or from the production of heavy glass. Either procedure is time consuming and expensive.

It was suggested in U.S. Pat. No. 3,664,820 that provision be made to angularly adjust the entire restrictor tile in order to control the direction of movement of the ribbon along the molten metal bath. This arrangement does not, however, provide sufficient latitude in adjustment of the restrictor tiles to accommodate fenders for the production of thick float glass. U.S. Pat. No. 3,433,612 suggests parallel restricting walls serving as extensions of the side jams of the spout and having extensions pivotally attached to their downstream ends whose splay can be adjusted to control spreading of the glass as it advances until it leaves the extensions and is allowed to spread laterally unhindered to the limit of its free flow. The restricting walls and extensions are wettable by the glass so as to provide a reacting force to the applied tractive effort on the glass as it is pulled toward the lehr.

The extensions are pivotally attached at the interior corners of the restricting tiles. U.S. Pat. No. 3,798,017 discloses adjustable lateral limiting blocks within a channel or feeder along which molten glass is conveyed from a melting furnace to a forming device. The limiting blocks have a closed pivot joint intermediate their ends.

SUMMARY OF THE INVENTION

In accordance with the present invention, the necessity for installing restrictor and/or extension tiles whose glass confining walls have different degrees of splay when converting a float glass facility to or from the production of heavy glass is eliminated by the provision of an improved extension tile at the downstream end of the conventional restrictor tile. The extension tile is pivotally mounted at its end adjacent the restrictor tile and its opposite, free end can be manipulated from outside the bath structure to select the desired splay and suitably position it relative to the line of fenders. The juncture between the extension and restrictor tiles is such that the extension tile can be angularly swung relative to the restrictor tile without molten glass or metal entering the juncture and impeding the angular movement.

It is, therefore, a primary object of the invention to provide an improved structure for producing a complete range of thicknesses of float glass.

Another object of the invention is to provide such a device which can more simply and readily be converted from production of glass of regular thicknesses (0.250 inch and thinner) to production of thick glass and vice versa.

Another object is to provide, in float glass apparatus, extension tiles which can be used for extended periods of time.

Still another object is to provide float glass apparatus in which the splay of the extension members can be readily changed during continued operation of the apparatus.

Yet another object is to provide within a float glass bath, a fixed restrictor tile and pivoted extension tile combination in which the two members are interrelated in such a manner that foreign material cannot enter the area between the two members to obstruct the movement of the extension tile throughout the range of its motion.

Other objects and advantages of the invention will become more apparent during the course of the following description when taken in connection with the accompanying drawings.

BRIEF DESCRIPTION OF THE DRAWINGS

In the drawings wherein like numerals refer to like parts throughout:

FIG. 2 is a longitudinal, vertical section taken substantially along line 2—2 of FIG. 1;

FIG. 3 is an enlarged fragmentary plan view showing the extension tile in the fully spread position and showing it in broken line in an alternate position for the production of heavy glass;

DESCRIPTION OF THE INVENTION

Figure 1:
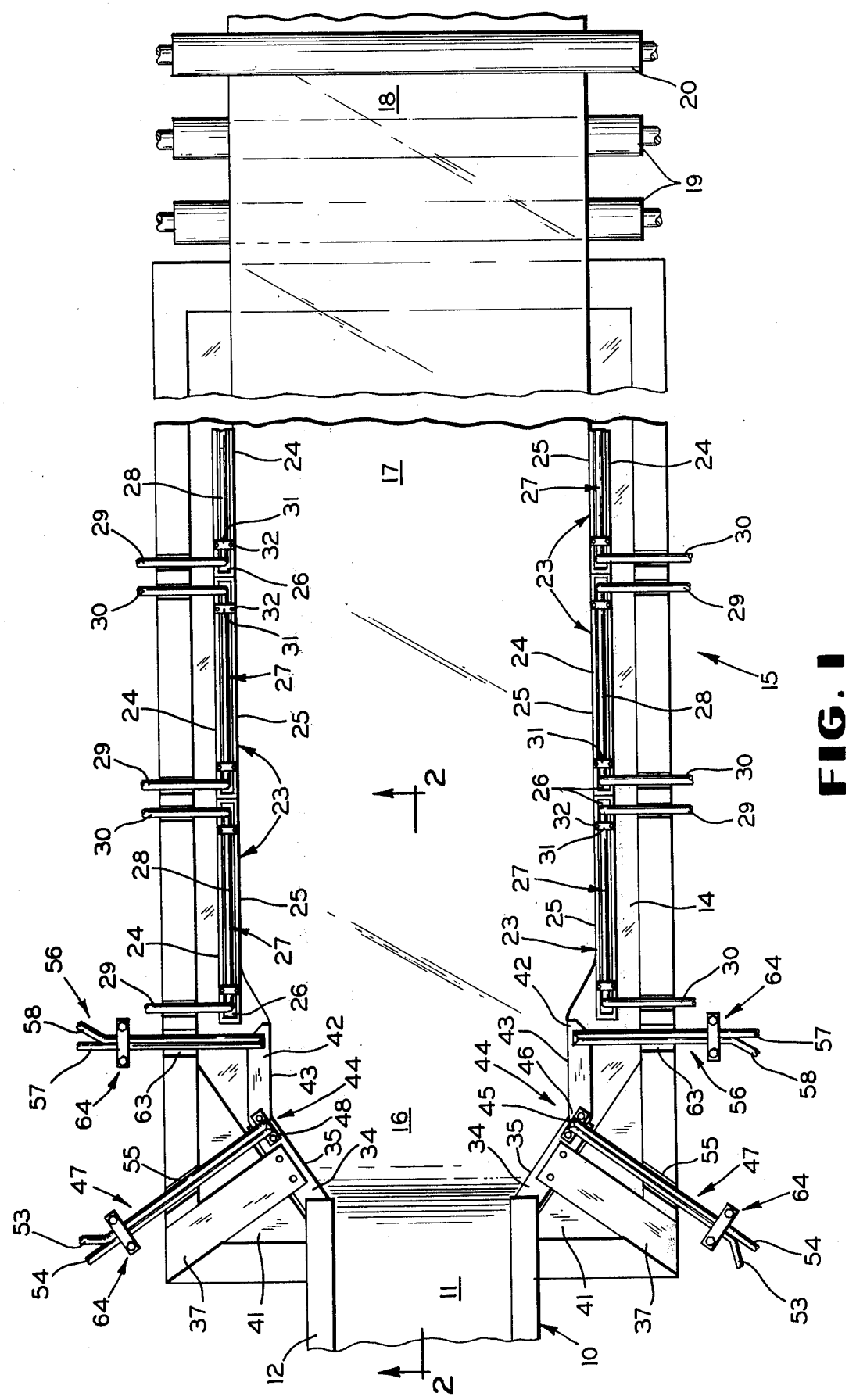
FIG. 1 is a plan view, with superstructure removed, of a representative form of apparatus for producing heavy float glass embodying the invention.

Referring to the drawings, there is illustrated generally in FIGS. 1 and 2 a typical float glass installation similar to the one disclosed in the aforementioned U.S. Pat. No. 3,663,196 for producing heavy float glass. Shown at 10 is the forehearth or canal of a continuous glass melting furnace (not shown) from which a supply of molten glass 11 is delivered through and over a spout assembly 12 in an amount regulated by a vertically adjustable control tweel 13. The glass flows from the spout 12 onto a relatively wide bath of molten metal 14 contained within a bath tank structure 15 and forms a buoyant body 16 of molten glass from which a buoyant layer 17 of stable thickness develops in ribbon form.

The headspace over the metal bath 14 and the tank 15 is enclosed by side and end walls and a roof (not shown), and suitable heating and cooling means (not shown) are employed to maintain the glass at the desired temperature so that the buoyant layer or ribbon 17 is progressively cooled as it moves over the molten metal bath to the discharge end thereof. By this time, the ultimate ribbon 18 reaches a condition of stiffness adequate to allow it to be transferred to an adjacent annealing lehr by mechanical conveying means without damage to its surfaces. One suitable type of mechanical conveying means which may be employed for this purpose includes a series of aligned, spaced supporting rolls 19 and a superimposed roll 20 above one of the rolls 19 at the end of the bath tank structure. Any or all of the rolls may be driven in a conventional manner and cooperate to apply a tractive effort to the ribbon of glass moving toward the outlet end sufficient to advance it along the bath. The enclosed headspace contains a protective gas, known as the float or bath atmosphere, which will not react chemically with the metal bath 14.

As best seen in FIG. 2, the molten glass 11 experiences a free fall of some distance from the spout 12 onto the bath of molten metal 14, and the buoyant layer thus formed is allowed to flow freely longitudinally along the bath. A heel 21 develops rearwardly of the spout. The heel of molten glass engages a wet back block 22 adjacent the rear wall of the bath tank structure 15 which assists in continuous maintenance of the heel.

The glass also tends to spread laterally as it advances to seek its equilibrium thickness. In order to limit this lateral spreading and maintain the glass layer at a thickness above its normal equilibrium thickness, the molten glass is conventionally confined between a series of spaced, essentially parallel fenders 23 until such a point in its advancement along the bath that it has achieved a uniform stable thickness and its temperature has been lowered sufficiently so that this thickness will be maintained without further confinement. The fenders 23 generally include an elongated member 24 having at least an inner face 25 for engaging the glass of a material which is not wetted thereby, and an upwardly opening cavity 26. While only the face 25 need be of a non-wetted material, the entire member 24 is generally fabricated of graphite because of its compatibility with the float bath environment.

Mounting devices 27 are provided for maintaining the fenders in position and removing heat therefrom to maintain the face 25 at a temperature below that at which the glass will stick to it. The mounting devices include a cooling tube 28 received within the cavity 26 through which a heat absorbing medium is circulated by means of inlet and outlet pipes 29 and 30, respectively. The inlet and outlet tubes are connected to a suitable source (not shown) of a heat absorbing medium (generally water) in any well-known manner. The elongated members 24 are affixed to the cooling tubes 28 by means of straps 31 and lag screws 32 threaded into the members 24. The fenders can thus be held in the desired position along the bath tank structure by conventional holding means (not shown) affixed to the inlet and outlet pipes 29 and 30. The cavity 26 may be filled with molten metal 33 from the bath 14 to improve heat transfer characteristics.

In conventional heavy float glass apparatus as shown in the aforementioned U.S. Pat. No. 3,663,196, the molten glass is poured onto the bath of molten metal where its lateral spreading is initially controlled by restricting means. It then emerges from between the restricting means and advances for some distance without control over its lateral spreading until it enters between the fenders. If excessive spreading should occur due to high temperatures or a greater than normal rate of delivery of molten glass, the glass may hang up on the ends of or go outside the fenders. Anytime it is desired to change the splay between the restricting members, and consequently the spreading of the molten glass before it enters between the fenders, the restricting members must be removed and replaced by members having a different configuration.

These difficulties are overcome in the present invention by providing in combination with the fenders, fixed restrictor tiles having pivotable extensions. The extensions assure that molten glass will not get behind or hang up on the fenders, and they can be adjusted from outside the bath structure to change from production of regular to heavy glass and vice versa and to change the splay during continuing uninterrupted operation.

Figure 4:
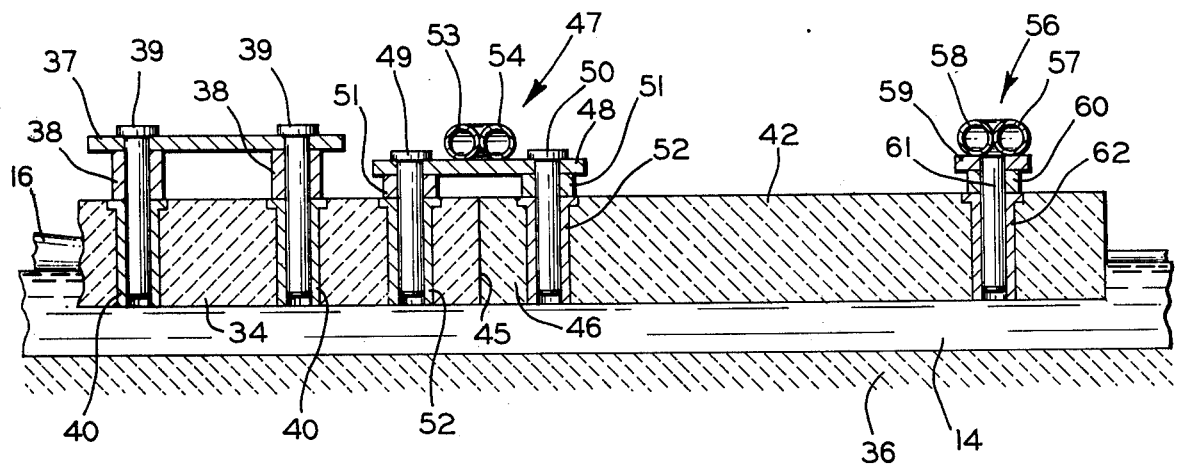
FIG. 4 is a vertical section taken substantially along line 4—4 of FIG. 3.

To this end, as shown in FIG. 1, there is provided a restrictor tile 34 at either side of the spout 12. The restrictor tiles define between their vertical glass confining faces 35 a diverging channel along which the buoyant body of glass 16 flows after it is deposited on the molten metal bath 14 from the spout 12. The restrictor tiles are generally formed of a refractory material whose density causes them to float in the molten metal 14 above the floor 36 of the bath tank structure, and are anchored in position by a bracket 37 affixed to the bath tank structure in a conventional manner. As shown in FIG. 4, the bracket has tubular projections 38 through which pins 39 extend into inserts 40 within the restrictor tile.

In order to prevent formation of areas of stagnant molten metal in the corner regions of the bath structure behind the restrictor tiles 34, filler blocks 41 are provided as part of the bath floor. The filler blocks occupy the triangular corner regions of the bath structure and extend upwardly above the level of the bath of molten metal and the buoyant body of glass thereon so as to preclude the possibility of molten metal and glass entering the region behind the restrictor tiles.

Extension tiles 42 pivotally mounted at the downstream ends of the restrictor tiles 34 have vertical glass contacting faces 43. The restrictor and extension tiles meet in a closed or ball-type pivot joint 44 so that the glass contacting surfaces 35 and 43, as well as the opposite longitudinal walls, present a continuous surface regardless of the angular relationship between the members. Molten glass is thus effectively prevented from entering the joint and devitrifying or otherwise immobilizing the joint whereby the extension tile could not be easily adjusted from outside the bath as in conventional devices. More particularly, the end of the restrictor tile 34 is formed with a circular recess 45 within which a mating circular end 46 of the extension tile is received. The restrictor and extension tiles are maintained in this mated pivotable relationship by a holding device 47 which is suitably secured to the bath tank structure.

As best shown in FIG. 4, each holding device includes a connecting plate 48 which extends over the interfitting ends of the restrictor and extension tiles. A pin 49 and a pivot pin or means 50 extend through the plate and spacers 51 therebeneath into inserts 52 in the restrictor and extension tiles 34 and 42, respectively. The pivot pin 50 is located at the center of curvature of the circular recess 45 of the restrictor tile and circular end 46 of the extension tile. The end of the extension tile is thus held within the recess of the restrictor tile while the extension tile itself can be pivotally swung about the pin 50 in its insert 52. Tubular members 53 and 54, interconnected at their inner end, are affixed to the plate 48 to hold it in the desired position. The tubular members extend through an opening 55 in the side wall of the bath structure and are connected to a source (not shown) by means of which a heat absorbing medium is circulated therethrough in conventional fashion. As will be hereinafter described, means is provided for securing the tubular members 53 and 54 to the bath tank structure to thereby maintain the holding device 47 in the desired position. Conventional means (not shown) such as a bellows device or refractory sealing cement is also provided for sealing the opening 55 around the tubular members to prevent the loss of bath atmosphere or ingress of external atmosphere.

An adjusting mechanism 56 is provided for pivoting each extension tile 42 about its associated pin 50 and maintaining it in the desired angular position. The adjusting mechanism includes an elongated member extending through the side wall of the tank structure as, for example, tubular members 57 and 58 interconnected at one end so that they may be cooled by circulating heat absorbing medium therethrough in a conventional manner from a suitable source (not shown). The tubular members are secured to a plate 59 which in turn carries a spacer 60. A pin 61 extends through the plate and spacer and into an insert 62 in the extension tile. The pin is freely rotatable within the insert so as to readily permit adjustment of the tile by manipulation of the adjusting mechanism 56 from outside the bath structure. In order to permit the extension tile 42 to be swung through the full range of motion between its extreme positions by the adjusting mechanism, an opening 63 of suitable size is provided in the side wall of the bath structure. As with the opening 55, suitable means (not shown) is employed to seal the opening 63 around the tubular members 57 and 58.

Figure 5:
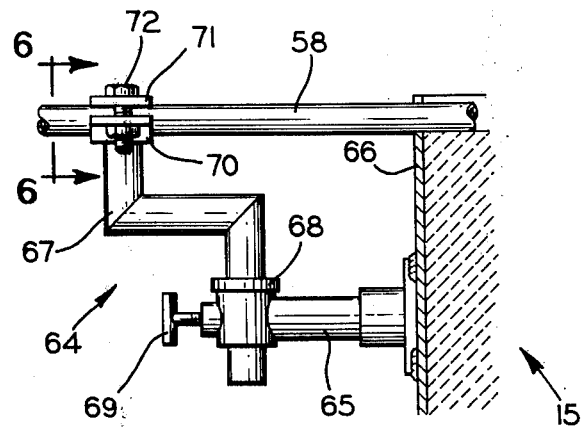
FIG. 5 is an enlarged elevational view of one form of device for securing the extension tile in selected angular position.
Figure 6:
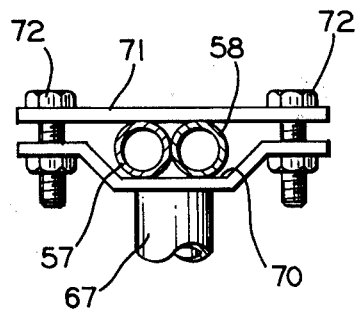
FIG. 6 is an elevational view taken substantially along line 6—6 of FIG. 5.

The holding device 47 and adjusting mechanism 56 are held in selected positions by support fixtures 64 which engage the tubular members 53, 54 and 57, 58 respectively, of these devices. The support fixtures for the holding device 47 and the adjusting mechanism 56 are essentially identical, and thus it will be understood that while the fixture is described in detail in connection with one device, it is used with both. As best shown in FIGS. 5 and 6, the support fixture includes a mounting bracket 65 affixed to the casing 66 of the bath tank structure 15 in a conventional manner as by welding. An offset tubular arm 67 has its lower leg received within a corresponding sleeve or collar 68 of the mounting bracket 65. A threaded clamping screw 69 on the sleeve 68 is adapted to be tightened against the lower leg of the tubular arm 67 and secured in the selected position relative to the bracket 65. The tubular members 53 and 54 of the holding device 47 or the tubular members 57 and 58 of the adjusting mechanism 56 are received within the recessed center portion of a base plate 70 affixed to the top of the upper leg of the tubular arm 67. A clamping strap 71 is urged downwardly against the tubular members as by a bolt 72 passing through the base plate and clamping strap to secure the tubular members therebetween.

It will thus be apparent that by proper manipulation of the support fixture 64, the holding device 47 and the adjusting mechanism 56 can be utilized to swing the extension tiles 42 about their respective pivot pins 50 to the desired angular position and to hold the tiles in this position. More particularly, the tubular arm 67 can be raised, lowered and rotated within the sleeve or collar 68 while the tubular members 53, 54 and 57, 58 can be moved longitudinally within the recess of the base plate 70 so that a full range of motion is provided for the holding device 47 and adjusting mechanism 56.

While such motion is not generally required for the holding device during normal operation of the float glass bath, it provides for ready removal and replacement of the extension tile during bath operation should this for any reason be necessary. The support fixture does permit the adjusting mechanism 56 to be readily manipulated from outside the bath to adjust the extension tile relative to the fenders 23 during production of heavy float glass and to swing them from the broken line to the full line position as illustrated in FIG. 3 for switching from production of heavy glass to glasses of less thickness and vice versa.

As hereinbefore described, since the extension tiles can be readily adjusted inwardly and outwardly relative to the fenders 23, it has been found possible to use conventional refractories in fabricating the restrictor and extension tiles instead of the graphite generally used heretofore for containing the glass in this area. Since the extension and restrictor tiles need not be replaced each time the apparatus is switched from production of regular to heavy glass and vice versa, the much longer service life provided by the refractory material is very beneficial. In those instances where the adhesion and frictional retarding force upon the glass by the refractory may be sufficient to have undesirable effects upon the sheet forming process such as, for example, unacceptable thickening of the ribbon edges, the glass contacting surfaces such as the vertical faces 43 may be provided with a coating 73 (FIG. 3) of the material which is non-adhering, or at least has a lower coefficient of friction relative to, the molten glass. For example, the faces may be coated with a suitable graphite paint.

Figure 7:
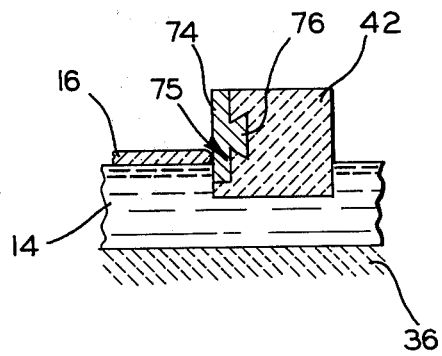
FIG. 7 is a transverse vertical section through a modified form of the extension tile of the invention.

Alternatively, as shown in FIG. 7, the extension tile 42 may be provided with an insert 74 of a durable, low friction material. The extension tile is provided with a recess 75 which extends below the surface of the metal bath 14. A dove tail projection 76 upon the rear of the insert is received within a corresponding dove tail slot in the extension tile to secure the insert in place. The insert thus extends below the level of the buoyant body of glass 16 so as to present a glass contacting surface with very little retarding effect upon the advancement of the glass. Boron nitride, due to its durability, low coefficient of friction and compatability with the bath atmosphere, may very satisfactorily be employed as the insert material.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In apparatus for producing float glass including a tank structure containing a bath of molten metal, means for delivering glass to the bath at a controlled rate and advancing the glass along the bath as a molten layer which is permitted to spread laterally on the bath, and a restrictor tile on each side of said delivering means initially restricting the divergent flow of the molten glass supplied from said delivering means, the improvement comprising, in combination, extension tiles extending downstream from the ends of said restrictor tiles, removable longitudinally extending fenders spaced from the tank side walls for receiving therebetween said molten glass from between said extension tiles to halt the lateral spread of the glass therebetween at a thickness greater than equilibrium and confine the advancing glass layer throughout their longitudinal extent until said layer has solidified sufficiently to prevent further lateral spreading, holding means pivotally securing the ends of said extension tiles adjacent said restrictor tiles whereby the downstream ends of said extension tiles can be swung between a position outwardly of said fenders and a position inwardly thereof, the adjacent ends of said restrictor and extension tiles being interfitted to form an enclosed pivot joint whereby the glass contacting sides of said restrictor and extension tiles present a substantially continuous surface at all angular positions of said extension tiles, and means securing said extension tiles at selected angular positions.

2. Apparatus for producing float glass as claimed in claim 1, wherein said enclosed pivot joint comprises a circular recess in one of said adjacent ends and a mating circular projection on the other of said adjacent ends.

3. Apparatus for producing float glass as claimed in claim 1, wherein said enclosed pivot joint comprises a circular recess in the end of said restrictor tile and a mating circular end on said extension tile received within said recess.

4. Apparatus for producing float glass as claimed in claim 1, wherein said means securing said extension tiles at selected angular positions includes an elongated member extending through the side wall of said tank structure, means pivotally connecting said elongated member to said extension tile at said downstream end thereof, and means adjustably securing said elongated member outside said tank whereby said extension tile can be moved to and secured in said selected angular positions from outside said tank by manipulating said elongated member and said means adjustably securing said elongated member.

5. Apparatus for producing float glass as claimed in claim 3, wherein said holding means pivotally securing the end of the extension tile comprises a pin extending into said extension tile at the center of curvature of said circular recess and said circular end.

6. Apparatus for producing float glass as claimed in claim 3, wherein said holding means pivotally securing the adjacent ends of said restrictor and extension tiles in interfitted relationship comprises a connecting plate, a pin extending from said plate into said restrictor tile, and a pin extending from said connecting plate into said extension tile at the center of curvature of said circular recess and said circular end.

7. Apparatus for producing float glass as claimed in claim 6, including means adjustably securing said connecting plate to said tank structure.

8. Apparatus for producing float glass as claimed in claim 7, wherein said means securing said extension tiles at selected angular positions includes an elongated member extending through the side wall of said tank structure, means pivotally connecting said elongated member to said extension tile at said downstream end thereof, and means adjustably securing said elongated member outside of said tank whereby said extension tile can be moved to and secured in said selected angular positions from outside said tank by manipulating said elongated member and said means adjustably securing said elongated member.

9. Apparatus for producing float glass as claimed in claim 1, in which said extension tiles are made of refractory material and include a glass contacting face having a coefficient of friction relative to the glass lower than that of said refractory material.

10. Apparatus for producing float glass as claimed in claim 9, in which said glass contacting face comprises a coating of graphite.

11. Apparatus for producing float glass as claimed in claim 9, in which said glass contacting face comprises an insert of boron nitride affixed to said extension tile.

12. In a method of operating a float glass facility to change from production of a glass ribbon of not substantially greater than equilibrium thickness to a ribbon of heavy glass wherein molten glass is continuously poured over a spout onto a body of molten metal in an elongated container between spaced restrictor tiles having extension tiles pivotally secured at their downstream ends and moved across said body to form said ribbon, the steps of installing fenders extending longitudinally along and spaced inwardly from the sides of said elongated container to restrict the lateral flow of said molten glass, and swinging the free ends of said pivotally secured extension tiles from a position outwardly of said fenders to a position inwardly thereof to direct said molten glass between said fenders.

13. A method of operating a float glass facility as claimed in claim 12, including the steps of swinging said extension tiles from said inward position to said outward position and removing said fenders to change from production of said ribbon of heavy glass back to production of said ribbon of not substantially greater than equilibrium thickness.

* * * * *